United States Patent Office 3,326,741
Patented June 20, 1967

3,326,741
ADHESIVE-COATED SHEET MATERIAL
Melvin M. Olson, Minneapolis, Minn., assignor to Minnesota Mining and Manufacturing Company, St. Paul, Minn., a corporation of Delaware
No Drawing. Filed May 18, 1962, Ser. No. 195,942
5 Claims. (Cl. 161—184)

This invention relates to adhesive tapes and bonding films. Embodiments of this invention provide backings coated with tacky solvent-free adhesive layers which are tacky at room temperature and which can be adhered to a metal or other surface and thereafter cured to a tack-free state in which they form a strong permanent bond with the surface.

Tacky and pressure-sensitive adhesive tapes have been known for many years, providing an extremely useful means for uniting a variety of materials. Sheet material provided on both sides with normally tacky and pressure-sensitive adhesive is commonly used for adhering one structure to another. Such tapes are convenient to use, but their application is limited by the fact that the adhesive not only has relatively low bonding strength but also may exhibit cohesive rupture when subjected to a moderate continued stress.

In the permanent bonding of structures where a high strength bond is desired, it is common to apply a solution of thermosetting adhesive to one structure, allow the solvent to evaporate, position a second structure on the surface of the adhesive layer, and subsequently cure the adhesive by applying heat and pressure. Another common procedure is to cast the adhesive solution on a release liner and evaporate the solvent to leave a dry nontacky bonding film. Insofar as I am aware no prior art heat-curing bonding adhesives or films are tacky at room temperatures after the solvent is evaporated, and when two structures are to be joined, it has been necessary to clamp the structures firmly in position, the film itself providing essentially no temporary holding or bonding power. Solvent activation of a nontacky film to achieve temporary tackiness is possible, but the procedure is inconvenient, dangerous, and time-consuming, requiring care to insure that all solvent is removed to prevent blistering during cure.

I have now devised a novel tape-like product in which the adhesive layer is normally tacky at room temperature and remains so for long periods of time. The tacky characteristic permits these materials to provide a temporary bond, which is sufficient to hold structures to be united in fixed position, and thereafter to be heat cured to a strong permanent bond. The use of complex clamping devices is obviated, and my invention renders it possible to bond vertical or even horizontally disposed and unsupported structures together firmly with no more than contact-maintaining pressure.

In accordance with my invention I provide a sheet backing material having a layer or coating of a solvent-free, tacky, heat-curable composition. This composition is formed from certain blends of nitrile rubber systems and thermosetting resin systems, at least half, and preferably at least ⅔, of such a resin system constituting liquid epoxy resin. It is difficult to establish firmly the viscosity of this epoxy resin, but it should be at least slowly pourable at room temperature. Depending on the specific properties desired, the thermosetting resin system may contain, in addition to the pourable epoxy resin, a solid epoxy resin, a reactive phenol-formaldehyde resin, a resorcinol formaldehyde resin, or other thermosetting resin materials which are compatible with the nitrile rubber and the pourable epoxy resin at the temperature of cure. In any event, the resin system should have an oxirane, or epoxy, equivalent of not more than about 1200, i.e., no more than about 1200 grams of resin for every 16 grams of oxirane oxygen. The system should also have a melting point of less than 100° C., and preferably either has a viscosity in excess of 100,000 centipoises, or is a solid or semi-solid material.

The resin system should also contain means for curing all resin present. Where a solid phenolic resin is present in substantial amount, the pourable liquid epoxy resin will react with it and no further curing agent is necessary. Where, on the other hand, the entire system consists essentially of epoxy resin, a separate curing agent which is effective at elevated temperatures but which is not rapidly effective at room temperature is included. Suitable curing agents where long shelf life is desired include dicyandiamide. Where a rapid cure is desired, or where the finished product is to be refrigerated, isophthalyl dihydrazide or $BF_3 400$ (an ethyl amine complex of boron trifluoride) may be used. Preferably all resins present in the thermosetting resin system are mutually soluble and compatible at room temperature; however, it is essential that they be mutually soluble at the temperature of cure in order to assure an intimate reaction between the various ingredients.

I blend one part of the resin system described in the preceding paragraph with from about ¼ part to about 2½ parts of a rubbery butadiene:acrylonitrile copolymer and, desirably, small but effective amounts of vulcanizing agents. The exact amount of butadiene-acrylonitrile copolymer to be blended with the resin system depends in part on the nature of the resin system itself. Thus, for example, where the resin system consists essentially entirely of liquid epoxy resin, it is necessary to employ a comparatively large amount of copolymer to provide a polymer blend which when cast in film form is free from excessive cold flow and ooziness. Since one of the major applications for this product is a sheet material which can be wound upon itself in roll form, stored for considerable periods of time prior to use, and subsequently unwound, freedom from excessive cold flow is desirable. Generally speaking, increasing the amount of nitrile rubber employed in the polymer blend increases the toughness and flexibility of the cured bond. On the other hand, increasing the amount of resin system present in the blend increases the cured strength.

At any rate, the amount of nitrile rubber employed is such that when the blend is cast from solvent and dried to provide a 3-mil film, the film is tacky, flexible, and self-sustaining, and the internal strength is comparable to that of many normally tacky and pressure-sensitive adhesives. It has an initial affinity for metal surfaces which is comparable to or greater than that of most normally tacky and pressure-sensitive adhesive tape, and it maintains a substantial percentage of this affinity after storage for six months at 40° F. When subjected to a cure of 15 minutes at 350° F., the tensile shear value of the cured layer is similar to that of existing nontacky bonding films and at least several times as great as that of any normally tacky pressure-sensitive adhesive film previously known to me. The temperature at which curing takes place can be reduced, with a corresponding increase in time, to obtain comparable tensile shear values. Likewise, the curing temperature can be increased, with a corresponding decrease in time. As a practical matter, the adhesive should not be exposed to temperatures appreciably in excess of 500° F.

I have found that certain tests are extremely useful in determining whether the characteristics of the blend referred to in the preceding paragraphs render it satisfactory for its intended uses. Three of these tests are described in succeeding paragraphs.

The internal strength of the uncured adhesive blend may be measured by coating from solution sufficient adhesive to deposit a dry 3-mil layer on paper, polyester film, or any other suitable flexible backing material. Two one-half inch wide strips of the coated backing are placed in face-to-face relationship so that they overlap each other by one-half inch, resulting in a mutual adhesive contact area of one-half inch by one-half inch. The two strips are pressed by rolling with a weighted roll in a standard manner. They are then tensioned by the application of a force of 1000 grams applied between the free ends of the two strips. The time for the face-to-face bond to fail (by sliding apart) is a measure of the internal strength of the adhesive. I have generally found that the time required for failure of suitable polymer blends is at least 5 minutes, and preferably in excess of 40 minutes; in many cases the time before failure occurs is several hours.

A quantitative measurement of the tackiness of the polymer blend may be made by the stripback adhesion test. In this test a strip of ½ inch wide sheet material, preferably 1-mil polyester film, is provided with a 3-mil coating of polymer blend, and placed adhesive face down on a strip of smooth oriented polyester film (e.g., "Mylar" polyethylene terephthalate), which in turn is firmly adhered to a smooth horizontally disposed steel plate. The strip is pressed into adhesive contact with the polyester film by passing a hard rubber roller weighing 4.5 lbs. once over the strip at a rate of 7.5 ft. per minute. The far end of the strip is attached to a suitable scale and the steel plate moved away from the scale at a rate of 7.5 ft. per minute. The portion of the tape removed comes back adjacent but not quite touching the portion still adherently attached. The scale reading in pounds is a measure of the adhesion to the polyester film. Even after storage for 6 months at 40° F. adhesive blends which I employ in the practice of my invention display an affinity for the polyester film equal to at least about ½ lb. per ½-inch of width, and preferably at least about 1 lb. per ½-inch of width, at room temperature. It has been found that the affinity for a smooth clean metal plate is several times higher than the affinity for polyester film.

The degree of bond strength obtained following cure of the adhesive layer may be measured by the tensile shear test. In this test two 7-inch x 4-inch x 0.064-inch aluminum panels are cleaned by a chromic acid bath etching procedure and assembled with a one-half inch overlap along their 7-inch edges, placing a tacky 3-mil film of polymer blend between the faying surfaces. The assembled panels are bonded in a heated press at a pressure of 50 lbs. per square inch and a temperature of 350° F. for a period of 15 minutes. The bonded assembly is then cooled and sawed, at right angles to the joint, into one inch wide test strips which are pulled apart at a rate of 0.05 inch per minute in an Instron tensile tester. Failure occurs in the bonding layer, the force required, expressed in pounds per square inch of overlap, being a measure of the bonding ability of the cured adhesive. Satisfactory products display a tensile shear value of at least 1000 p.s.i., and preferably at least 2000 p.s.i., after cure. The best previously known normally tacky pressure-sensitive adhesive films, when subjected to the same test, display a tensile shear value of no more than about 300 p.s.i.

Although my invention embraces the use of a tacky and curable layer in combination with a wide variety of sheet backings, several specific products are contemplated. One such product, which may be designated as a thermosetting adhesive transfer tape, comprises a temporary laminate of a backing and a tacky curable film of the type previously described. Products of this type may be wound in roll form, unwound like conventional tacky and pressure-sensitive adhesive tape, and applied to one surface of a structure which is to be bonded. The temporary backing may then be removed, exposing a second tacky surface of the adhesive layer, to which a second structure may be adhered. The two structures aer thus firmly adhered to each other, and, upon the application of heat for a suitable period of time are permanently bonded by the curing of the adhesive film.

Another embodiment specifically contemplated is a tape product in which the tacky polymer blend layer is permanently adhered to a reinforcing backing, such as woven glass cloth. The finished product is suitable for wrapping electrical components, the tacky nature of the polymer blend serving to hold the tape in position during application and prior to final cure of the blend. In still another type of product a non-woven fibrous web is included internally of the polymer blend layer, considerably enhancing its otherwise low film strength prior to cure. Further contemplated products include tacky adhesive coated sheet material which is suitable for outdoor applications where conventional tacky and pressure-sensitive adhesives fail because of exposure to ultra-violet light and water.

My invention will be further illustrated by reference to the following illustrative but non-limitative examples in which all parts are by weight unless otherwise noted:

*Example 1*

A mill base was prepared by adding 0.615 part of "Hycar" 1001x 225 butadiene:acrylonitrile copolymer, having a butadiene:acrylonitrile ratio of 57:43 to a cold rubber mill, together with a stoichiometric amount of a latent heat-activated curing agent for epoxy resins (0.067 part of dicyandiamide) and a nitrile rubber vulcanizing composition consisting of 0.031 part of zinc oxide, 0.012 part of powdered sulfur, and .0092 part of benzothiazyl disulfide. These ingredients were milled together for approximately 8 minutes until a smooth homogeneous mixture having a Mooney viscosity of approximately 85–90 was obtained.

The mill base was placed in a paddle type churn and 0.300 part of "Epon 1004," 0.633 part of "Cardolite NC–514" which had previously been heated at 300° F. to raise its viscosity from approximately 50,000 centipoises to about 200,000 centipoises, and 2.06 parts of methyl ethyl ketone added. These components were then mixed for 16–20 hours, yielding a uniform solution containing about 50% polymer blend. "Epon 1004," available from Shell Chemical Co., is a condensation product of epichlorohydrin and bisphenol "A," having a specific gravity of 1.154, an average molecular weight of approximately 400, and an epoxy equivalent of 870–1025 grams per 16 grams of oxirane oxygen. "Cardolite NC–514," available from the Irvington Division of Minnesota Mining and Manufacturing Co., is a viscous epoxy resin having an epoxy equivalent of approximately 400 grams per 16 grams of oxirane oxygen; after heating as described the epoxy equivalent is approximately 525. The resin is obtained by reacting a mixture of poly(hydroxy phenyl)

pentadecanes derived from cashew nut shell liquid with epichlorohydrin to yield a product having the approximate formula:

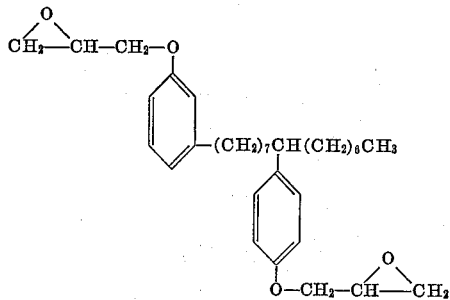

The solution described in the preceding paragraph was knife coated on one side of a silicone-treated paper liner in an amount sufficient to provide 24 dry grains of polymer blend per 24 square inches (approximately 3 ounces per square yard). The solvent was evaporated by heating the coated web for 20 minutes in an air circulating oven at a temperature gradually increasing from 110° to 190° F. As the dried web was removed from the oven, a 4-mil white-pigmented polyethylene sheet was laminated to the exposed surface of the tacky adhesive, after which the composite web was wound into large rolls. The large rolls were subsequently unwound and the silicone-treated paper liner removed, leaving the polyethylene removably laminated to the adhesive layer, at which time the laminate was slit to desired width and wound into smaller rolls.

The polymer blend of this example appeared to be completely homogeneous, and its internal strength, when measured by the test previously described, was in excess of 45 minutes. When coated as a 3-mil film, its initial stripback adhesion to oriented polyester was over 3 lbs. per half inch of width and after being stored for 6 months at 75° F. it maintained a value on the order of 2 lbs. per one-half inch of width. The tensile shear bond strength of this polymer blend after curing was aproximately 2000 lbs. per square inch.

The product of this example has numerous industrial uses, one of which involves the bonding of an electrotype shell to a composite aluminum-vinyl plate. In this application the exposed tacky surface of the polymer blend layer is applied to the surface of a rigid polyvinyl chloride sheet which is in turn placed over and in contact with a perforated aluminum plate. The polyethylene liner is then removed from the adhesive and the electrotype shell adhered to the vinyl sheet by means of the newly exposed tacky surface of the adhesive. The adhesive may then be cured in a heated press at 350° F. for 15 minutes, this operation also serving to soften the vinyl, forcing it through the perforations in the aluminum, and firmly bonding the aluminum, vinyl sheet, and electrotype shell into a composite structure. The exposed electrotype shell may then be routed as desired to leave "islands" of print which are bonded by means of the cured adhesive layer to the electrotype plate. Despite the severe shock and stress imposed on such "islands" during long printing runs, it is found that superb adhesion is maintained and substantially no failure occurs.

Example 2

A mill base identical to that of Example 1, except that the nitrile rubber content was reduced to 0.460 part, was prepared and dissolved in 2.0 parts of methyl ethyl ketone. The solution was placed in a churn as in Example 1 and 0.225 part of "Epon 1004" and 0.708 part of "Cardolite NC–514" added. After 16–20 hours the resultant solution was removed from the churn and knife-coated on heat-cleaned glass cloth (60 x 52 thread count, 6 mil caliper, weighting 3.65 ounces per square yard) in the amount of 28 dry grains per 24 square inches (3.5 oz. per square yard). After the solvent had been evaporated as in Example 1, the polymer blend was found to have penetrated the glass cloth and become firmly anchored to it. The finished tape-like product was found to be useful in electrical installations.

The polymer blend of this Example 2 had an internal strength value of 35 minutes and an initial stripback adhesion to polyester film of 2 lbs. per half inch. The tensile shear value of the adhesive, after curing 15 minutes at 350° F., was about 1500 p.s.i. After an accelerated aging test of 168 hours at 120° F., empirically found to correspond to at least six months at room temperature, a 3-mil film of polymer blend displayed a stripback adhesion to polyester film of 1 lb. per half inch.

Example 3

A solution of polymer blend identical to that employed in Example 2 was prepared and coated on a silicone-treated paper liner in an amount sufficient to provide 10 dry grains per 24 square inches (1.25 ounces per square yard). Solvent was evaporated as in Example 1 and a nonwoven web (formed from 60% 3-denier rayon fibers, 20% 1½-denier rayon fibers, and 20% nitrile rubber binder, having a thickness of 3–4 mils and weighing 5 grains per 24 square inches) laminated to the tacky surface. The exposed surface of the nonwoven web was then coated with the same solution of polymer blend in an amount sufficient to provide 20 dry grains per 24 square inches (2.5 ounces per square yard) and the solvent again evaporated as in Example 1. As the web was removed from the drying oven, 4-mil white pigmented polyethylene was laminated to the exposed surface of the tacky adhesive and the silicone-treated paper subsequently removed in the manner described in Example 1 to leave a laminate of polyethylene and nonwoven web-reinforced adhesive.

Products of the type described in this Example 3 provide a tacky adhesive film which has sufficient strength to be dispensed and supplied to equipment where the polyethylene backing is removed and the nonwoven web-reinforced adhesive film fed directly into a laminating press.

Where, as in the preceding two examples, the backing which supports the polymer blend is comparatively absorbent, rather than non-absorbent, as in Example 1, oozing of the uncured adhesive is less serious. Accordingly, products of the type described in Examples 2 and 3 may employ more fluid thermosetting resin systems, e.g., having a viscosity of somewhat below 100,000 centipoises in compounding the tacky adhesive polymer blend. Preferred products, however, are still compounded to maintain the internal strength of the uncured adhesive as high as is reasonably possible.

In the table listed below are set forth various polymer blends which are suitable for making products of the type described in the first three examples, together with pertinent comments. In each case the polymer blends were compounded, as in Example 2, by preparing a mill base of nitrile rubber, vulcanizing agents, and resin hardeners, dissolving the base in three times its weight of methyl ethyl ketone, and adding to aliquot portions of the solution the thermosetting resin components, to yield a 40% solution of the blended polymers.

| Polymer Blend | Thermosetting Resin System ||||| Nitrile Rubber | Polymer Blend |||| Comments |
| --- | --- | --- | --- | --- | --- | --- | --- | --- | --- | --- | --- |
| | Liquid Epoxy | Solid Resin | Weight Percent Liquid Resin | Hardener for Epoxy Resin | Epoxy Equivalent of System | Viscosity of System, cps. | | Rubber: Resin Ratio | Internal Strength, Minutes | Affinity for Polyester Film, oz./½ in. | Tensile Shear After Cure, lb./in.² |
| A | Cardolite NC-514 [3] | BRPA [7] 4401 | 63 | | 800 | >200,000 | Hycar 1002 [13] | 0.25:1 | 6 | 44 | 2,018 | Requires refrigeration; internal strength gradually increases. |
| B | do | CKR [8] 1282 | 63 | | 800 | >200,000 | do | 0.25:1 | ca. 5 | 76 | 1,300 | Good tack retention at room temperature; most useful in fabric-reinforced film. |
| C | do | Plyophen [9] 5657 | 63 | | 800 | >200,000 | do | 0.25:1 | ca. 6 | 53 | 2,308 | Similar to "A" in physical characteristics. |
| D | do | Varcum [10] 899 | 63 | Dicyandiamide | 800 | >200,000 | do | 0.25:1 | ca. 5 | 80 | 1,250 | Similar to "B" in physical characteristics. |
| E | do | Penacolite B16 [11] | 71 | | 700 | >200,000 | Hycar 1001z 225 | 0.43:1 | ca. 5 | 60 | 2,360 | Similar to "A" but with somewhat better tack retention. |
| F | do | BRPA [12] 4404 | 71 | | 700 | >200,000 | do | 0.43:1 | 20 | 44 | 1,780 | Suitable for transfer tape without internal reinforcement. |
| G | Epon 828 [1] | BRPA [12] 4404 | 71 | | 280 | 45,000 | do | 0.43:1 | ca. 5 | 75 | 2,035 | Requires internal reinforcement to avoid oozing. |
| H | Epon 834 [2] | BRPA [12] 4404 | 71 | | 350 | >200,000 | do | 0.43:1 | ca. 20 | 24 | 3,113 | Suitable for transfer tape without internal reinforcement. |
| I | Polyallylglycidyl ether | BRPA [12] 4404 | 57 | | 245 | >200,000 | do | 0.43:1 | ca. 5 | >100 | 1,175 | Exceptionally tacky but requires internal reinforcement. |
| J | Kopoxite 159 [3] | Epon 1004 | 67 | Dicyandiamide | 185 | 153,000 | do | 0.67:1 | ca. 15 | 24 | 2,820 | Similar to "H" in physical characteristics. |
| K | Epon [4] 812 | do | 67 | do | 215 | 21,000 | do | 0.67:1 | ca. 5 | >100 | 1,696 | Similar to "I" in physical characteristics. |
| L | Araldite DP-440 [5] | do | 67 | do | 310 | >200,000 | do | 0.67:1 | ca. 30 | 19 | 1,685 | Suitable for transfer tape without internal reinforcement. |
| M | Cardolite NC-51 [4] | do | 75 | do | 575 | >200,000 | Hycar [14] 1043 | 1.5:1 | 42 | 16 | 1,774 | Adheres quickly and tenaciously to substrates. |
| N | Epon [6] 836 | | 100 | do | 315 | >200,000 | Hycar 1001z 225 | 0.67:1 | 80 | 28 | 3,360 | Excellent balance of properties; does not require internal reinforcement. |
| O | do | | 100 | do | 315 | >200,000 | do | 1.5:1 | 262 | 27 | 3,070 | Do. |

[1] Epichlorohydrin-bisphenol "A"-type epoxy resin having a viscosity of 100-160 poises at 25° C. and an epoxy equivalent of 180-195, supplied by Shell Chemical Co.
[2] Epichlorohydrin-bisphenol "A"-type epoxy resin, slowly pourable at 25° C., having an epoxy equivalent of 230-280, supplied by Shell Chemical Co.
[3] Resorcinol diglycidyl ether, having a viscosity of 500 centipoises at 25° C. and an epoxy equivalent of 128, supplied by Koppers Co., Inc.
[4] Epichlorohydrin glycerin-type epoxy resin having a viscosity of 0.9-1.5 poises at 25° C. and an epoxy equivalent of 140-160, supplied by Shell Chemical Co.
[5] Flame-retardant chlorine-containing epoxy resin having a viscosity of 2,700 cps. at 25° C. and an epoxy equivalent of 230, supplied by Ciba Products Corp.
[6] Epichlorohydrin-bisphenol "A"-type epoxy resin softening at 40-45° C., having an epoxy equivalent of 280-350, supplied by Shell Chemical Co.
[7] One- and two-stage oil-soluble heat-reactive phenol-formaldehyde resin having a melting point of 55-70° C., supplied by Bakelite Co.
[8] Heat-reactive oil-soluble phenol-formaldehyde resin having a melting point of 62-99° C., supplied by Bakelite Co.
[9] One-stage heat-reactive oil-insoluble cresol-phenol-formaldehyde resin having a melting point of 65-75° C., supplied by Reichhold Chemicals, Inc.
[10] Heat-reactive oil-soluble phenol-formaldehyde resin having a melting point of 85-95° C., supplied by Varcum Chemical Corp.
[11] Two-stage resorcinol-formaldehyde resin having a melting point of 120°-130° C., supplied by Koppers Co., Inc.
[12] One- and two-stage heat-reactive oil-soluble phenol-formaldehyde resin, similar to BRPA 4401, supplied by Bakelite Co.
[13] 67:33 butadiene:acrylonitrile copolymer, supplied by Goodrich Chemical Co.
[14] 72:28 butadiene:acrylonitrile copolymer, supplied by Goodrich Chemical Co.

I am aware that others have taught the blending of nitrile rubbers and epoxy resins to prepare adhesive cements and heat-curing nontacky bonding films (see Been and Grover U.S. Patents No. 2,879,252 and 2,920,990), but insofar as I am aware no one has previously prepared sheet material having a tacky, pressure-sensitive adhesive layer which can be heat-cured to a strong, hard permanent bond. In thus distinguishing my invention over prior art products I have illustrated various embodiments and provided information enabling those skilled in the art to prepare many specific products. It will be apparent that products other than those specifically illustrated can be prepared without departing from the spirit of what I have taught. Accordingly, my invention is limited only by the scope of the appended claims.

What I claim is:

1. A sheet backing provided at least at one major surface with a tacky, heat-hardenable, substantially solvent-free, cold flow-resistant, coherent layer which essentially comprises a storable uniform blend of polymers which are mutually soluble at 300° F., consisting essentially of: one part of a substantially entirely curable thermosetting resin system having an epoxy equivalent of not more than about 1200 and a softening point of less than 100° C., said resin system essentially comprising at least about one-half part reactive epoxy resin pourable at room temperature, and means for curing all resin in said system, and from about ¼ part to about 2½ parts, constituting substantially all the remainder of said blend, of a rubbery butadiene:acrylonitrile copolymer system present in amount such as to render said blend when formed per se in a 3-mil layer, tacky, flexible and self-sustaining, possessed of an internal strength value of at least about 5 minutes, retentive of an affinity for the surface of a smooth oriented polyester film equal to at least about one-half lb. per half inch of width, when measured after storage at 40° F. for six months, and capable of displaying a tensile shear value of at least 1000 p.s.i. after cure.

2. A composite tape-like product capable of being wound upon itself in roll form and subsequently unwound without delamination or transfer comprising a flexible sheet backing having adhered thereto over one major surface a tacky, heat-hardenable, substantially solvent-free, cold flow-resistant coherent layer which essentially comprises a uniform blend of polymers mutually soluble at 300° F. and consisting essentially of: one part of a substantially entirely curable thermosetting resin system having an epoxy equivalent of not more than about 1200 and a softening point of less than 100° C. prior to cure, said resin system essentially comprising at least ½ part reactive epoxy resin pourable at room temperature and means for curing the resin present, and from about ¼ part to about 2½ parts, constituting substantially all the remainder of said blend, of a rubbery butadiene:acrylonitrile copolymer system present in amount such as to render said blend when formed per se in a 3-mil layer, tacky, flexible and self-sustaining, possessed of an internal strength value of at least 5 minutes, retentive of an affinity for the surface of a smooth oriented polyester film equal to at least about one lb. per half inch of width, when measured after storage at 40° F. for six months, and capable of displaying a tensile shear value of at least 1000 p.s.i.

3. A flexible sheet backing provided at one major surface with a tacky, heat-hardenable, substantially solvent-free, cold flow-resistant, coherent layer which essentially comprises a storable uniform blend of mutually soluble polymers consisting essentially of: one part of a substantially entirely thermosetting epoxy resin system consisting essentially of: from about ½ part to about ¾ part of a viscous epoxy resin obtained by reacting a mixture of poly(hydroxy phenyl) pentadacanes derived from cashew nut shell liquid with epichlorohydrin to yield a product having the approximate formula:

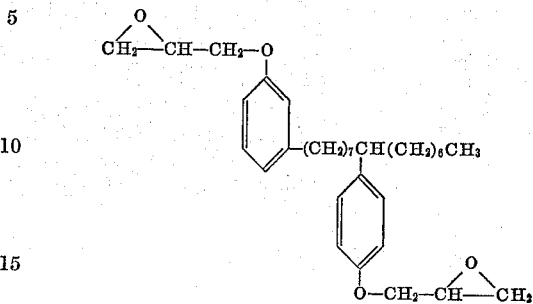

which is further reacted to a viscosity of about 200,000 centipoises and an epoxy equivalent of about 500, correspondingly from about ½ part to about ¼ part of a solid epoxy resin which is a polyglycidyl ether of bisphenol "A" having an epoxy equivalent of about 1000, and a stoichiometric amount of a latent curing agent for said epoxy resins, and from about ½ part to about 1 part of a heat-curable rubbery butadiene:acrylonitrile copolymer system, consisting essentially of a rubbery butadiene:acrylonitrile copolymer and of vulcanizing agents therefor.

4. A composite thermosetting adhesive transfer tape comprising in combination a self-supporting smooth web and, releasably adhered to one face of said web, a tacky, heat-hardenable substantially solvent-free adhesive film having an affinity for smooth polyester film equal to at least about one lb. per half inch of width, whereby the exposed surface of said adhesive may be adhered to a structure to be bonded, the web removed without disrupting the adhesive film, a second structure applied to the newly exposed adhesive surface and temporarily adhered thereby to the first structure, and the adhesive film thereafter heat-cured to permanently bond said structures together, said adhesive film consisting essentially of a blend of mutually soluble polymers, said blend having an epoxy equivalent of less than 1200, a softening point of less than 100° C., and a viscosity of at least 100,000 centipoises, said blend consisting essentially of: one part of a heat-hardenable epoxy resin system consisting essentially of about ⅔ part of a reactive epoxy resin which is a highly viscous liquid at room temperature, about ⅓ part of a reactive epoxy resin which is a solid at room temperature, and a stoichiometric amount of latent curing agent for epoxy resins, and from about ½ part to 1 part of a rubbery vulcanizable butadiene:acrylonitrile copolymer system, consisting essentially of a rubbery butadiene:acrylonitrile copolymer and of vulcanizing agents therefor, the proportions of said polymers being further selected so as to provide a composition which, when formed per se in a thin film is tacky, flexible and self-sustaining, retentive of an affinity for the surface of a smooth oriented polyester film equal to at least about one lb. per half inch of width, after storage at 75° F. for six months, and capable of displaying a tensile shear value of at least 1000 p.s.i. after cure when subjected to the test herein described.

5. A fiber-reinforced tacky heat-advancing adhesive film comprising in combination a fibrous web provided, at least at one major surface, with a tacky, heat-hardenable, substantially solvent-free blend of mutually soluble polymers consisting essentially of: one part of a heat-hardenable epoxy resin system having an epoxy equivalent of no more than 1200 and consisting essentially of about ⅔ part of epoxy resin which is liquid at room temperature, about ⅓ part of an epoxy resin which is solid at room temperature, and a small but effective amount of curing agent for epoxy resins, and from about ¼ part to about 2½ parts of a rubbery vulcanizable butadiene:acrylonitrile copolymer system consisting essentially of a rubbery butadiene:acrylonitrile copolymer and of vulcanizing agents therefor, the proportions of said polymers being further selected so as to provide a composition which, when formed per se in a thin film is tacky, flexible and self-sustaining, possessed of an internal strength value of at least 5 minutes, retentive of an affinity for the surface of a smooth oriented polyester film equal to at least about one lb. per half inch of width, after storage at 75° F. for six months, and capable of displaying a tensile shear value of at least 1000 p.s.i. after cure when subjected to the test herein described.

References Cited

UNITED STATES PATENTS

| | | | |
|---|---|---|---|
| 2,191,704 | 2/1940 | Bennett | 156—230 |
| 2,850,406 | 9/1958 | Gold et al. | 117—122 |
| 2,879,252 | 3/1959 | Been et al. | 260—4.15 |
| 2,920,990 | 1/1960 | Been et al. | 156—330 |
| 3,068,117 | 12/1962 | Korpman | 260—45.5 |

ALEXANDER WYMAN, *Primary Examiner.*

EARL M. BERGERT, *Examiner.*

R. J. ROCHE, M. A. LITMAN, *Assistant Examiners.*

UNITED STATES PATENT OFFICE
CERTIFICATE OF CORRECTION

Patent No. 3,326,741                          June 20, 1967

Melvin M. Olson

It is hereby certified that error appears in the above numbered patent requiring correction and that the said Letters Patent should read as corrected below.

Column 4, line 21, for "aer" read -- are --; columns 7 and 8, in the table, twelfth column, line 12 thereof, for "1,685" read -- 2,685 --.

Signed and sealed this 11th day of June 1968.

(SEAL)
Attest:

Edward M. Fletcher, Jr.
Attesting Officer

EDWARD J. BRENNER
Commissioner of Patents